United States Patent
Tastekin et al.

(10) Patent No.: US 10,476,366 B2
(45) Date of Patent: Nov. 12, 2019

(54) DC-DC CONVERTER AND METHOD FOR CONTROLLING A DC-DC CONVERTER

(71) Applicant: Robert Bosch GmbH, Stuttgart (DE)

(72) Inventors: David Tastekin, Stuttgart (DE); Stefan Butzmann, Schalksmühle (DE)

(73) Assignee: Robert Bosch GmbH, Stuttgart (DE)

( * ) Notice: Subject to any disclaimer, the term of this patent is extended or adjusted under 35 U.S.C. 154(b) by 196 days.

(21) Appl. No.: 15/025,605

(22) PCT Filed: Sep. 2, 2014

(86) PCT No.: PCT/EP2014/068615
§ 371 (c)(1),
(2) Date: Mar. 29, 2016

(87) PCT Pub. No.: WO2015/043892
PCT Pub. Date: Apr. 2, 2015

(65) Prior Publication Data
US 2016/0241124 A1    Aug. 18, 2016

(30) Foreign Application Priority Data
Sep. 30, 2013   (DE) .......................... 10 2013 219 679

(51) Int. Cl.
*H02M 1/00*       (2006.01)
*H02M 3/00*       (2006.01)
*B60L 50/50*      (2019.01)

(52) U.S. Cl.
CPC .............. *H02M 1/00* (2013.01); *B60L 50/50* (2019.02); *H02M 3/00* (2013.01); *H02M 2001/0074* (2013.01); *H02M 2001/0093* (2013.01)

(58) Field of Classification Search
CPC .................................. H02M 1/00; H02M 3/00
(Continued)

(56) References Cited

U.S. PATENT DOCUMENTS

| 5,229,928 A | 7/1993 | Karlsson et al. |
| 6,181,576 B1 | 1/2001 | Ikeda et al. |
(Continued)

FOREIGN PATENT DOCUMENTS

| CN | 101345490 A | 1/2009 |
| DE | 10100862 | 7/2002 |
(Continued)

OTHER PUBLICATIONS

International Search Report for Application No. PCT/EP2014/068615 dated Jun. 29, 2015 (English Translation, 2 pages).
(Continued)

*Primary Examiner* — Rexford N Barnie
*Assistant Examiner* — Joseph N Inge
(74) *Attorney, Agent, or Firm* — Michael Best & Friedrich LLP

(57) ABSTRACT

The invention relates to a DC-DC converter with a first input voltage connection and a second input voltage connection, between which an input DC voltage can be applied, a first converter device, which is designed to convert a first sub-voltage of the input DC voltage into an output DC voltage, and a second convertor device, which is coupled between the first input voltage connection and the second input voltage connection in a series circuit relative to the first convertor device on the input side and which is designed to convert a second sub-voltage of the input DC voltage into an output DC voltage. The DC-DC converter further comprises a control device which is coupled to the first convertor device and the second converter device and which is designed to operate the first converter device with a variable first sub-voltage and the second converter device with a constant second sub-voltage.

9 Claims, 3 Drawing Sheets

(58) Field of Classification Search
USPC .......................................................... 307/9.1
See application file for complete search history.

(56) References Cited

U.S. PATENT DOCUMENTS

| | | | |
|---|---|---|---|
| 6,459,175 B1 * | 10/2002 | Potega | G01R 31/36 |
| | | | 307/149 |
| 2004/0233685 A1 | 11/2004 | Matsuo et al. | |
| 2009/0206804 A1 | 8/2009 | Ku et al. | |
| 2010/0117612 A1 * | 5/2010 | Klootwijk | H01L 27/0805 |
| | | | 323/282 |
| 2012/0007431 A1 | 1/2012 | Jang et al. | |
| 2016/0125791 A1 * | 5/2016 | Park | G09G 3/2096 |
| | | | 345/211 |

FOREIGN PATENT DOCUMENTS

| | | | | |
|---|---|---|---|---|
| JP | 2005204421 A | 7/2005 | | |
| WO | 02056450 | 7/2002 | | |
| WO | WO 02056450 A1 * | 7/2002 | ............ | H02M 3/285 |
| WO | WO-02056450 A1 * | 7/2002 | ............ | H02M 3/285 |
| WO | 2011132206 | 10/2011 | | |

OTHER PUBLICATIONS

Chen et al., "DC/DC Conversion Systems Consisting of Multiple Converter Modules: Stability, Control and Experimental Verification", IEEE Transactions on Power Electronics, vol. 24, No. 6, Jun. 2009.

Siri et al., "Uniform Voltage Distribution Control for Series-Input Parallel-Output, Connected Converters", IEEEAC paper 1074, v. 6, Jan. 2006.

* cited by examiner

DC-DC CONVERTER AND METHOD FOR CONTROLLING A DC-DC CONVERTER

BACKGROUND OF THE INVENTION

The invention relates to a DC-DC converter and to a method for controlling a DC-DC converter, in particular for the voltage supply of an on-board electrical system of a hybrid or electric vehicle from a high-voltage network.

In hybrid and electric vehicles, the supply of a low-voltage on-board electrical system can be ensured by the high-voltage network which is used to supply the electrical drive of the hybrid vehicle. To this end, a DC-DC converter, in particular a push-pull converter with a center tap on the secondary side, which extracts energy from the high-voltage network and converts the high voltage of the high-voltage network into a corresponding on-board electrical system voltage.

The DC-DC converter must cover a broad input and output voltage range due to the high voltage fluctuations in the high-voltage network and in the on-board electrical system. In order to counteract this tendency, a step-up converter can, for example, be connected upstream of the DC-DC converter on the high-voltage network side. Alternatively, a multi-stage system comprising a series circuit consisting of DC-DC converters can be used the publications Chen, W.; Ruan, X; Yan, H.; Tse C. K.: "DC/DC Conversion Systems Consisting of Multiple Converter Modules: Stability, Control and Experimental Verification", IEEE Transactions on Power Electronics, Vol. 24, No. 6, June 2009 and Siri, K; Willhoff, M; Truong, C.; Conner, K. A.: "Uniform Voltage Distribution Control for Series-Input Parallel-Output, Connected Converters", IEEEAC paper '1074, v. 6, January 2006 each disclose, for example, multi-stage voltage converter structures, which are connected in series on the input side and connected in parallel on the output side. Said multi-stage voltage converters thereby consist of a plurality of voltage converter stages, by means of which the input voltage can be regulated.

There is, however, the need for solutions for the DC-DC conversion in which the DC voltage converters used can be operated at an optimal working point.

SUMMARY OF THE INVENTION

The present invention therefore relates according to one aspect to a DC-DC converter with a first input voltage connection and a second input voltage connection, between which an input DC voltage can be applied, a first converter device, which is designed to convert a first sub-voltage of the input DC voltage into an output DC voltage, and a second converter device, which is coupled between the first input voltage connection and the second input voltage connection in a series circuit relative to the first converter device on the input side and which is designed to convert a second sub-voltage of the input DC voltage into an output DC voltage. The DC-DC converter further comprises a control device which is coupled to the first converter device and the second converter device and which is designed to operate the first converter device with a variable first sub-voltage and the second converter device with a constant second sub-voltage.

According to a further aspect, the present invention relates to an electrically operated vehicle comprising a high-voltage network, an on-board electrical system and a DC-DC converter, which couples the high-voltage network to the on-board electrical system and which is designed to convert a high-voltage DC voltage of the high-voltage network into an on-board electrical system DC voltage for the on-board electrical system.

According to a further aspect, the present invention relates to a method for controlling a DC-DC converter, comprising the following steps: converting a first sub-voltage of an input DC voltage into an output DC voltage using a first converter device, converting a second sub-voltage of the input DC voltage into an output DC voltage using a second converter device, operating the first converter device with a variable first sub-voltage and operating the second converter device with a constant second sub-voltage.

A concept of the present invention is to provide a DC-DC converter comprising voltage converter stages in two converter groups which are connected in series on the input side. One of the two converter groups, which can draw the minimum input voltage, can respectively be operated with a constant input voltage. The other of the two converter groups can then be operated with variable input voltage in order to be able to cover the spread of the input voltage range. The voltage converter stages which are operated with a constant input voltage can advantageously be optimized towards a constant working point, which considerably improves the efficiency thereof.

A significant advantage of this procedural approach is that not all of the voltage converter stages of the DC voltage converter have to be designed for the same (high) input voltage range. Efficient types of converters which can be used at constant working points, such as resonance converters, can instead be used for a portion of the voltage converter stages.

According to one embodiment of the DC-DC converter, the first converter device can have a plurality of DC-DC converter modules which are coupled in a series circuit on the input side and in a parallel circuit on the output side and which can each be operated with a module sub-voltage of the first sub-voltage as input voltage.

According to a further embodiment of the DC-DC converter, the second converter device can have a plurality of DC-DC converter modules which are coupled in a series circuit on the input side and in a parallel circuit on the output side and which each can be operated with a constant module sub-voltage of the second sub-voltage as input voltage.

In both cases, the number of DC-DC converter modules used in each case can be suitably selected such that power semiconductor switches with a lower reverse voltage can be used. In comparison to power semiconductor switches with a higher reverse voltage, such as, for example, super junction MOSFETs, such switching elements incur significantly lower implementation costs.

In addition, the input voltage spread as well as the performance capability of DC-DC converters constructed in this manner can be scaled in an advantageous way by the modular design.

According to a further embodiment of the DC-DC converter, the first and/or second DC-DC converter modules can each have resonance converters. This type of converter can be used particularly advantageously to achieve high levels of efficiency if it is ensured that the working point does not have to be varied or substantially varied.

According to a further embodiment of the DC-DC converter, the first converter device and the second converter device can be connected in parallel on the output side.

According to an alternative embodiment of the DC-DC converter, the first converter device and the second converter device can be connected in series on the output side. In so doing, the control device can be designed in a further embodiment to operate the first converter device with a variable first output voltage and the second converter device with a constant second output voltage.

This is particularly advantageous because the second converter device can not only be operated with a constant input voltage but also with a constant output voltage. As a result, the design of the second converter device is further improved with regard to performance efficiency and power efficiency.

Further features and advantages of embodiments of the invention ensue from the following description with reference to the accompanying drawings.

DETAILED DESCRIPTION

Figure 1:
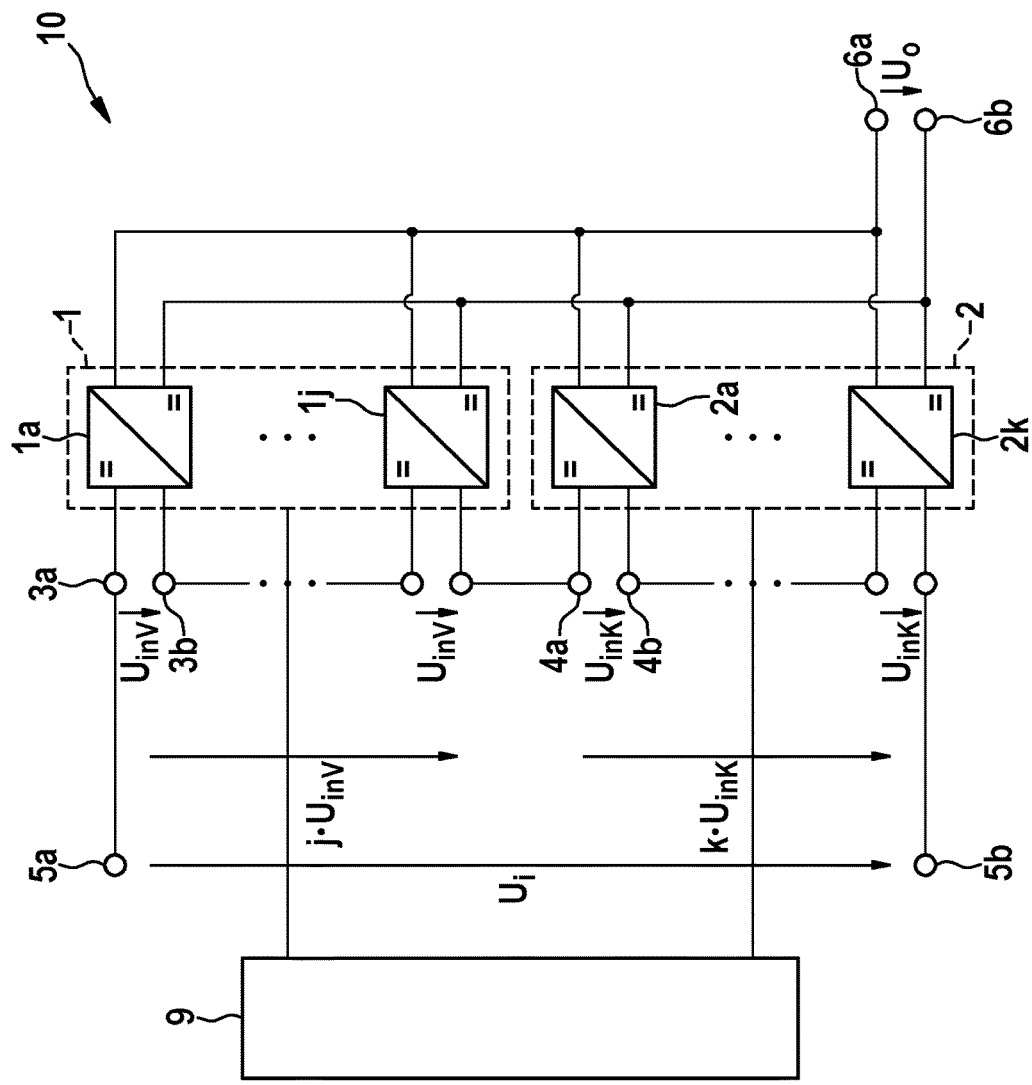
FIG. 1 shows a schematic depiction of a DC-DC converter according to one embodiment of the invention.

FIG. 1 shows a schematic depiction of a DC-DC converter 10 which can, for example, be used in an electric drive system, for example of a hybrid or electric vehicle. The electric drive system can comprise a high-voltage source in a high-voltage network, for example a traction battery or another energy storage device of a hybrid or electric vehicle. The high-voltage source can thereby feed a high-voltage intermediate circuit, which can, for example, comprise an intermediate circuit capacitor. Said high-voltage intermediate circuit can be coupled to the input connections 5a and 5b of the DC-DC converter 10 and provide a high-voltage DC voltage as input voltage $U_i$ for the DC-DC converter 10. Said DC-DC converter 10 can then convert this input voltage $U_i$ into an output DC voltage $U_o$, which can be tapped at the output connections 6a or, respectively, 6b of said DC-DC converter 10 in order, for example, to be provided as an on-board electrical system DC voltage in an on-board electrical system of the hybrid or electric vehicle.

The output DC voltage $U_o$ can, for example, be used in this case to supply a low-voltage battery or, respectively, an on-board battery. A multiplicity of on-board loads can furthermore be connected to the on-board electrical system, which can selectively be connected to or disconnected from the output connections of the DC-DC converter 10. On-board electrical system loads can, for example, comprise an air conditioning system, a cigarette lighter, an on-board computer, a hi-fi system or similar electrical components of a vehicle.

Exemplary and typical value ranges for the input voltage $U_i$ comprise roughly 200 V to 340 V or also 250 V to 500 V and for the output DC voltage $U_o$ approximately 9 V to 15.5 V. These value ranges can be subject to strong fluctuations so that the DC-DC converter 10 or, respectively the components thereof should be designed to compensate said fluctuations.

To this end, the DC-DC converter 10 of FIG. 1 comprises a SIPO topology, i.e. two converter devices 1 or, respectively, 2 are connected serially, respectively in series, on the input side via respective converter input connections 3a, 3b or, respectively, 4a, 4b; whereas the converter devices 1 or, respectively, 2 are connected in parallel on the output side.

The number of the converter devices 1 and 2 is only depicted as two by way of example; however, any other number greater than two can likewise be provided for the converter devices 1 or 2. In so doing, the additional converter devices can be constructed in a similar manner as the converter devices 1 or 2 and be coupled in series on the input side and in parallel on the output side to said converter devices 1 or, respectively, 2.

The DC-DC converter 10 comprises a first converter device 1, which is designed to convert a first sub-voltage $j \cdot U_{inV}$ of the input DC voltage $U_i$ into a first output DC voltage. The sub-voltage $j \cdot U_{inV}$ is calculated according to the number of the DC-DC converter modules 1a to 1j which are provided in the first converter device 1 and can each, for example, be identically constructed. The DC-DC converter modules 1a to 1j are coupled in a series circuit on the input side via respective module input connections 3a, 3b; thus enabling each of the DC-DC converter modules 1a to 1j to draw a module sub-voltage $U_{inV}$ as input voltage. The DC-DC converter modules 1a to 1j are coupled in a parallel circuit on the output side.

The DC-DC converter 10 further comprises a second converter device 2, which is coupled between the first input voltage connection 5a and the second input connection 5b in a series circuit relative to the first converter device 1 on the input side and which is designed to convert a second sub-voltage $k \cdot U_{inK}$ of the input DC voltage $U_i$ into a second output DC voltage. In the example of FIG. 1, the output connections of the first converter device 1 and the second converter device 2 are coupled in a parallel circuit so that the first output voltage of the first converter device 1 corresponds to the second output voltage of the second converter device 2. That means that both converter devices 1 and 2 contribute to the same total output voltage $U_o$.

In an analogous manner to the first converter device 1, the second converter device 2 comprises DC-DC converter modules 2a to 2k and is designed to convert a second sub-voltage $U_{inK}$ of the input DC voltage $U_i$ into an output DC voltage. The sub-voltage is calculated in this case according to the number of the DC-DC converter modules 2a to 2k which are provided in the second converter device 2 and can, for example, be constructed identically in each case. The DC-DC converter modules 2a to 2k are coupled on the input side in a series circuit via respective module input connections 4a, 4b; thus enabling each of the DC-DC converter modules 2a to 2k to draw a module sub-voltage $U_{inK}$ as input voltage. The DC-DC converter modules 2a to 2k are coupled in a parallel circuit on the output side.

The number of the DC-DC converter modules 1a to 1j and the number of the DC-DC converter modules 2a to 2k can be different—in particular, it is possible to dimension the number of the individual DC-DC converter modules or, respectively, their relationship to one another in such a way that the first sub-voltage $j \cdot U_{inV}$ of the input voltage spread drawn by the first converter device 1 and the second sub-voltage $k \cdot U_{inK}$ drawn by the second converter device 2 correspond to the minimum value of the input voltage range of the input voltage $U_i$. This enables the first converter device 1 to be operated with a variable first sub-voltage $j \cdot U_{inV}$ and the second converter device 2 to be operated with a constant second sub-voltage $k \cdot U_{inK}$.

This can, for example, be carried out by a control device 9 which is coupled to the first converter device 1 and to the second converter device 2 and is designed to correspondingly control the DC-DC converter modules 1a to 1j or, respectively, 2a to 2k of the first and second converter device 1 or, respectively, 2.

The first and/or second DC-DC converter modules 1a to 1j and 2a to 2k can each advantageously comprise a resonance converter. This converter type can be operated particularly efficiently when the working point is constant.

Figure 2:
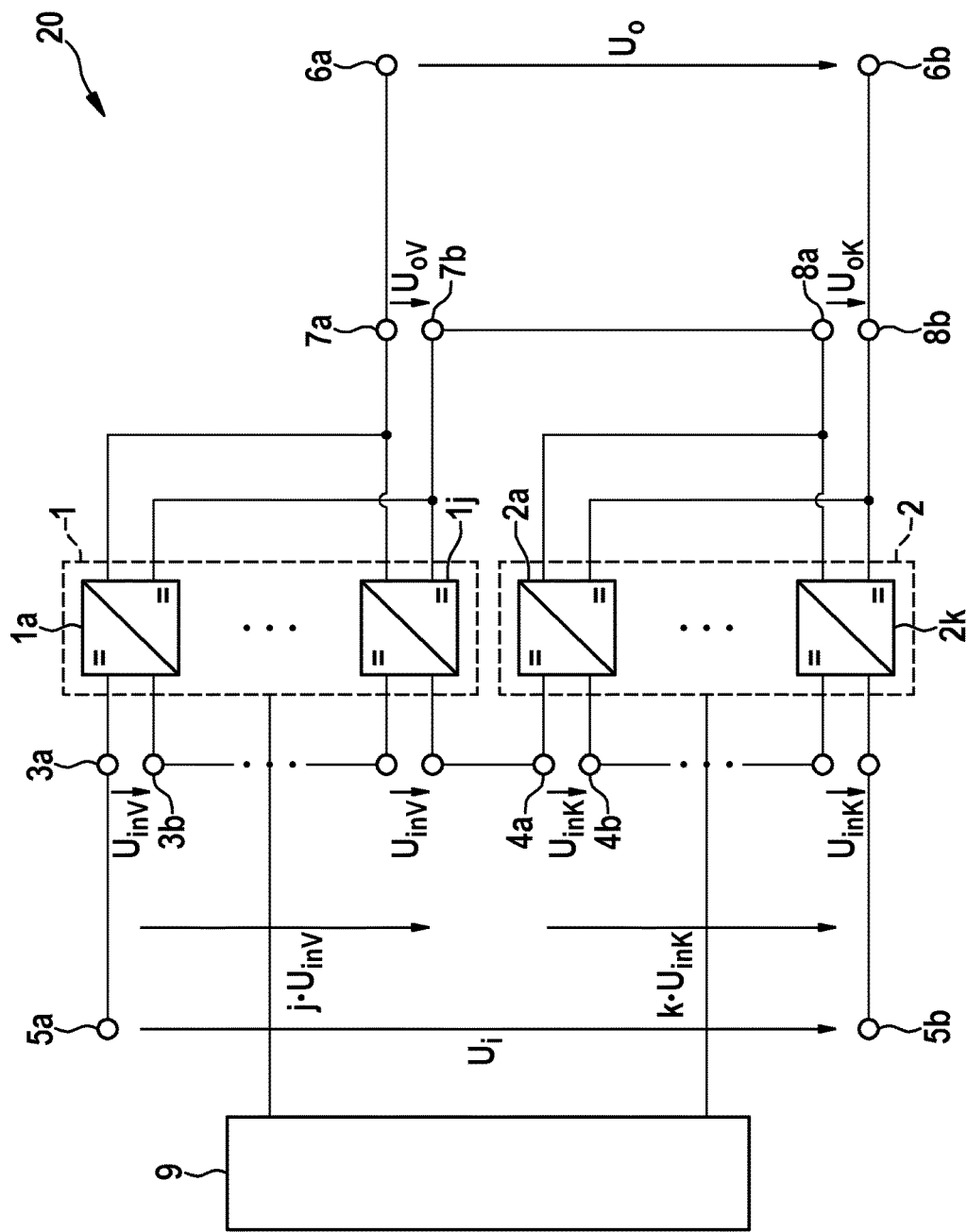
FIG. 2 shows a schematic depiction of a DC-DC converter according to a further embodiment of the invention.

FIG. 2 shows a schematic depiction of a further DC-DC converter 20. The DC-DC converter 20 differs from the DC-DC converter 10 of FIG. 1 substantially by virtue of the fact that the first converter device 1 and the second converter device 2 are not connected in parallel on the output side but rather are connected in series via sub-output connections 7a and 7b or, respectively, 8a and 8b. The first converter device 1 can therefore provide a variable output voltage $U_{oV}$, the second converter device a constant output voltage $U_{oK}$ which add up to the total output voltage $U_o$ at the output connections 6a and 6b.

In this context, the control device 9 can furthermore be designed to operate the first converter device 1 with a variable first output voltage $U_{oV}$ and to operate the second converter device 2 with a constant second output voltage $U_{oK}$. In other words, the first converter device 1 can contain the output voltage spread, while the second converter device 2 can cover the minimum value of the output voltage range.

That enables a further performance optimization of the DC-DC converter modules 2a to 2k of the second converter device 2.

Figure 3:
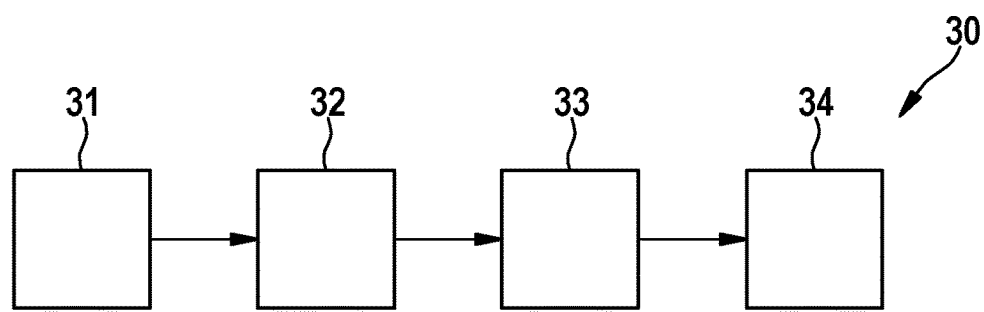
FIG. 3 shows a schematic depiction of a method for controlling a DC-DC converter according to a further embodiment of the invention.

FIG. 3 shows a schematic depiction of a method 30 for controlling a DC-DC converter, in particular a DC-DC converter 10 or 20 in an electric drive system of a hybrid or electric vehicle, as exemplarily shown in FIG. 1 or, respectively, FIG. 2. In a first step 31, a first sub-voltage $j \cdot U_{inV}$ of an input DC voltage $U_i$ is converted into an output DC voltage using a first converter device 1. In a second step 32, a second sub-voltage $k \cdot U_{inK}$ of the input DC voltage $U_i$ is converted into an output DC voltage using a second converter device 2.

As a result, the first converter device 1 is operated with a variable first sub-voltage $j \cdot U_{inV}$ in step 33, and the second converter device 2 is operated with a constant second sub-voltage $k \cdot U_{inK}$ in step 34.

The invention claimed is:

1. A DC-DC converter (10; 20) comprising:
a first input voltage connection (5a) and a second input voltage connection (5b), between which an input DC voltage ($U_i$) can be applied;
a first converter device (1) which is configured to convert a first sub-voltage ($j \cdot U_{inV}$) of the input DC voltage ($U_i$) into an output DC voltage;
a second converter device (2), which is coupled between the first input voltage connection (5a) and the second input voltage connection (5b) in a series circuit to an input of the first converter device (1) and which is configured to convert a second sub-voltage ($k \cdot U_{inK}$) of the input DC voltage ($U_i$) into an output DC voltage; and
a control device (9) directly connected to the first converter device (1) by a first connection and directly connected to the second converter device (2) by a second connection, the control device (9) configured to determine a variable first sub-voltage (j·UinV) equal to the input DC voltage (Ui) minus a constant second sub-voltage (k·UinK), and to control the first converter device (1) via the first connection to use the variable first sub-voltage (j·UinV) and to control the second converter device (2) via the second connection to use the constant second sub-voltage (k·UinK);
wherein the input DC voltage (Ui) is coupled across the series connected first converter device (1) and the second converter device (2) and is split up between the first converter device (1) and the second converter device (2).

2. The DC-DC converter (10; 20) according to claim 1, wherein the first converter device (1) has a plurality of DC-DC converter modules (1a; 1j) which are coupled in a series circuit on the input side and in a parallel circuit on the output side and which each ca are operated with a module sub-voltage ($U_{inV}$) of the first sub-voltage ($j \cdot U_{inV}$) as input voltage.

3. The DC-DC converter (10; 20) according to claim 1, wherein the second converter device (2) comprises a plurality of DC-DC converter modules (2a; 2k), which are coupled in a series circuit on the input side and in a parallel circuit on the output side and which each are operated with a constant module sub-voltage ($U_{inK}$) of the second sub-voltage ($k \cdot U_{inK}$) as input voltage.

4. The DC-DC converter (10; 20) according to claim 1, wherein at least one of the first and second DC-DC converter modules (1a; 1j; 2a; 2k) have resonance converters.

5. The DC-DC converter (10) according to claim 1, wherein the first converter device (1) and the second converter device (2) are connected in parallel on the output side.

6. The DC-DC converter (20) according to claim 1, wherein the first converter device (1) and the second converter device (2) are connected in series on the output side.

7. The DC-DC converter (20) according to claim 6, wherein the control device (9) is further configured to operate the first converter device (1) with a variable first output voltage ($U_{oV}$) and to operate the second converter device (2) with a constant second output voltage ($U_{oK}$).

8. An electrically operated vehicle, comprising:
a high-voltage network;
an on-board electrical system; and
a DC-DC converter (10; 20) according to claim 1, which couples the high-voltage network to the on-board electrical system and which is configured to convert a high-voltage DC voltage of the high-voltage network into an on-board electrical system DC voltage for the on-board electrical system.

9. A method (30) for controlling a DC-DC converter (10; 20) comprising the following steps:
determining a variable first sub-voltage ($j \cdot U_{inV}$) based on the input DC voltage ($U_i$);
determining a constant second sub-voltage ($k \cdot U_{inK}$)
converting (31) the first variable sub-voltage ($j \cdot U_{inV}$) of an input DC voltage ($U_i$) into an output DC voltage using a first converter device (1);
converting (32) the second constant sub-voltage ($k \cdot U_{inK}$) of the input DC voltage ($U_i$) into an output DC voltage using a second converter device (2);
operating (33) the first converter device (1) with the first variable sub-voltage ($j \cdot U_{inV}$); and
operating (34) the second converter device (2) with the second constant sub-voltage ($k \cdot U_{inK}$);
wherein the first and second converter devices (1 and 2) are connected in series and the input DC voltage ($U_i$) is applied across the series connected first and second converter devices (1 and 2);
wherein a control device (9) is directly connected to the first converter device (1) by a first connection and directly connected to the second converter device (2) by a second connection, the control device (9) is configured to determine the variable first sub-voltage (j·UinV) as equal to the input DC voltage (Ui) minus the constant second sub-voltage (k·UinK), and to control the operation of the first converter device (1) via the first connection to use the variable first sub-voltage ($j \cdot UinV$) and to control the operation of the second converter device (2) via the second connection to use the constant second sub-voltage ($k \cdot UinK$).

* * * * *